United States Patent
Hope

(10) Patent No.: US 9,819,389 B2
(45) Date of Patent: Nov. 14, 2017

(54) SINGLE PATH SIGNAL CONDITIONER FOR BI-DIRECTIONAL RADIO FREQUENCY SIGNALS IN A TELECOMMUNICATIONS NETWORK

(71) Applicant: Thomason Broadband Supply, Spartanburg, SC (US)

(72) Inventor: J. Christian Hope, Spartanburg, SC (US)

(73) Assignee: Thomason Broadband Supply, Spartanburg, SC (US)

(*) Notice: Subject to any disclaimer, the term of this patent is extended or adjusted under 35 U.S.C. 154(b) by 0 days.

(21) Appl. No.: 15/078,493

(22) Filed: Mar. 23, 2016

(65) Prior Publication Data
US 2017/0279492 A1 Sep. 28, 2017

(51) Int. Cl.
*H04B 3/00* (2006.01)
*H04L 25/00* (2006.01)
*H04B 3/50* (2006.01)

(52) U.S. Cl.
CPC ..................... *H04B 3/50* (2013.01)

(58) Field of Classification Search
CPC .. H04B 1/525; H04B 3/46; H04B 3/50; H04L 5/14; H04N 7/17309; H04N 7/102
See application file for complete search history.

(56) References Cited

U.S. PATENT DOCUMENTS

| | | | | |
|---|---|---|---|---|
| 5,990,929 | A * | 11/1999 | Sandaluk | H04N 7/17309 348/E7.07 |
| 6,785,907 | B1 * | 8/2004 | Dan | H04N 7/17309 330/302 |
| 8,154,361 | B2 | 4/2012 | Magin | |
| 8,464,301 | B2 | 6/2013 | Olson et al. | |
| 8,487,717 | B2 | 7/2013 | Alkan et al. | |
| 8,516,537 | B2 | 8/2013 | Kelma et al. | |
| 8,584,192 | B2 | 11/2013 | Palinkas et al. | |
| 2006/0031911 | A1 * | 2/2006 | Shafer | H04N 21/6118 725/121 |
| 2013/0342272 | A1 | 12/2013 | Riggsby et al. | |

OTHER PUBLICATIONS

Technetix, "Network amplifiers", May 2015 Retrieved from https://files.technetix.com/pdf/datasheets/DBD-1200_06022014_final_v2_2.pdf.*
1GHz Feederline Equalizer FFE-*-100*/RP-R Catalog Sheet—5 pages.
Advanced System Design Product Specifications—FFE-8-**S/RP Feederline Equalizer—1 page.
Arris, FFE-*-100*/RP-R 1GHZ Feederline Equalizer—4 pages.

* cited by examiner

*Primary Examiner* — Daniel Washburn
*Assistant Examiner* — Amneet Singh
(74) *Attorney, Agent, or Firm* — Dority & Manning, P.A.

(57) ABSTRACT

A signal conditioning device for conditioning bi-directional radiofrequency (RF) signals in a telecommunications network is provided. The signal conditioning device can allow for the conditioning of both upstream and downstream components of a bi-directional telecommunications signal in a telecommunication system using a signal conditioning device disposed at a single location. The signal conditioning device can include first and second line connections and a signal path between the first and second line connections. The signal conditioning device can condition upstream and downstream components of a bi-directional telecommunications signal using plug-in signal conditioning circuits received into one or more external plug-in sockets coupled to the signal path.

16 Claims, 4 Drawing Sheets

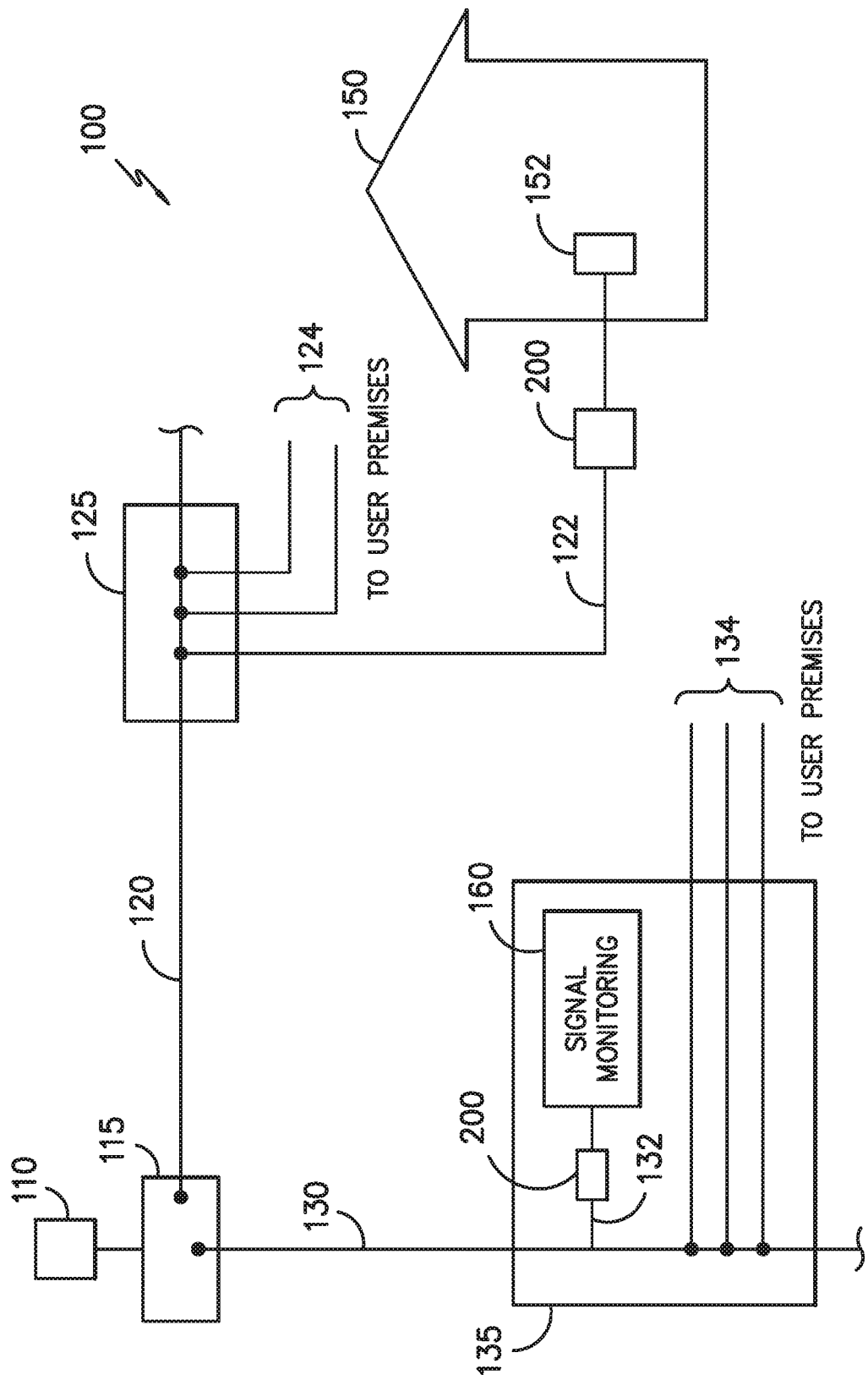
FIG. -1-

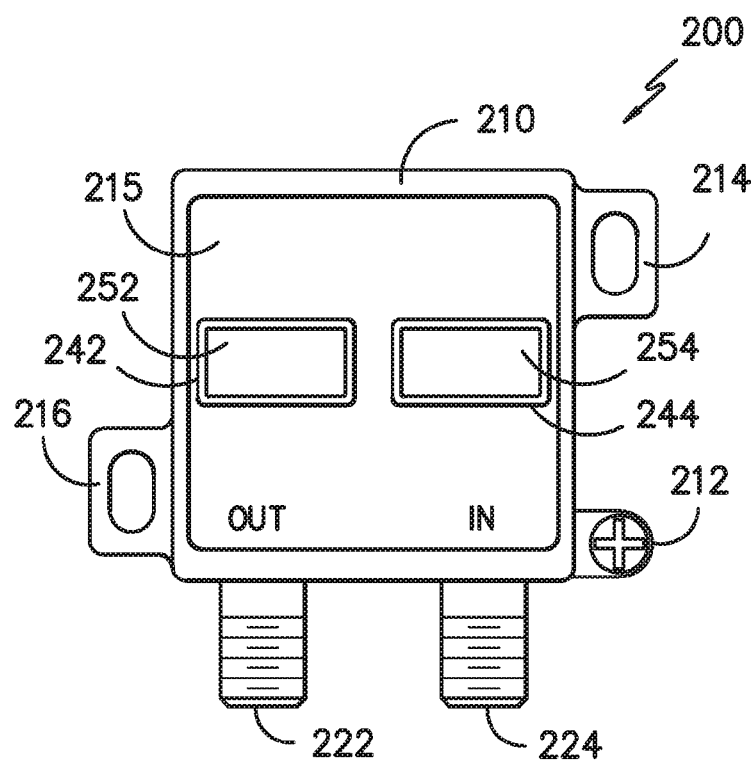
FIG. -2-
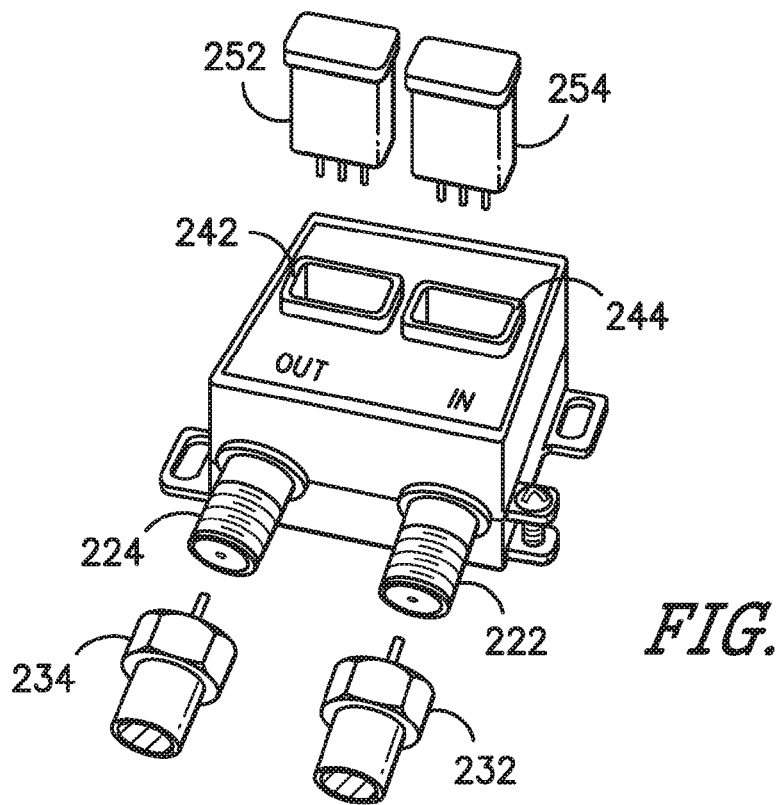
FIG. -3-

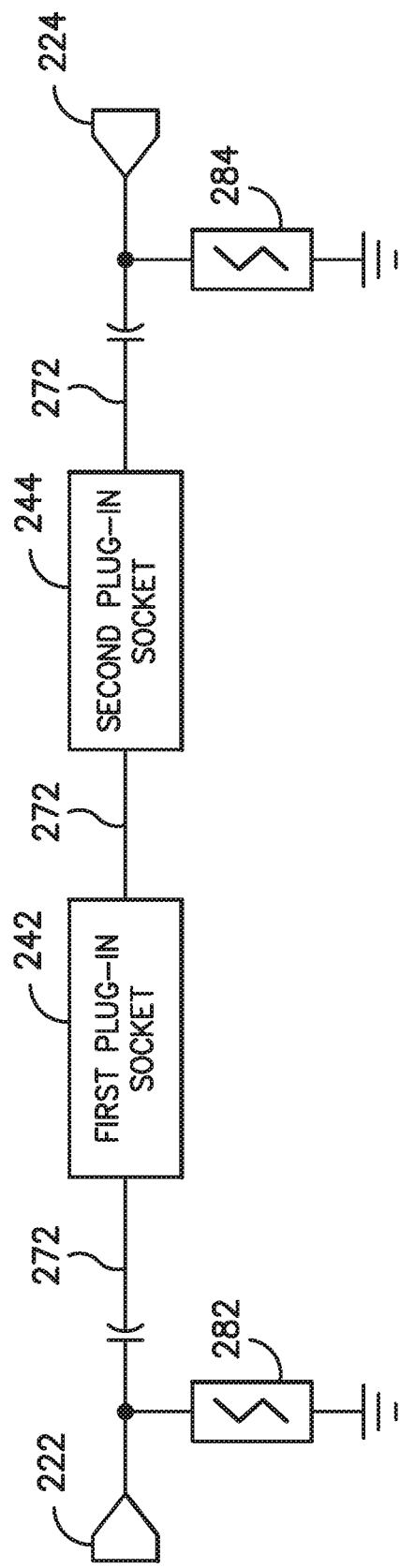
FIG. -4-

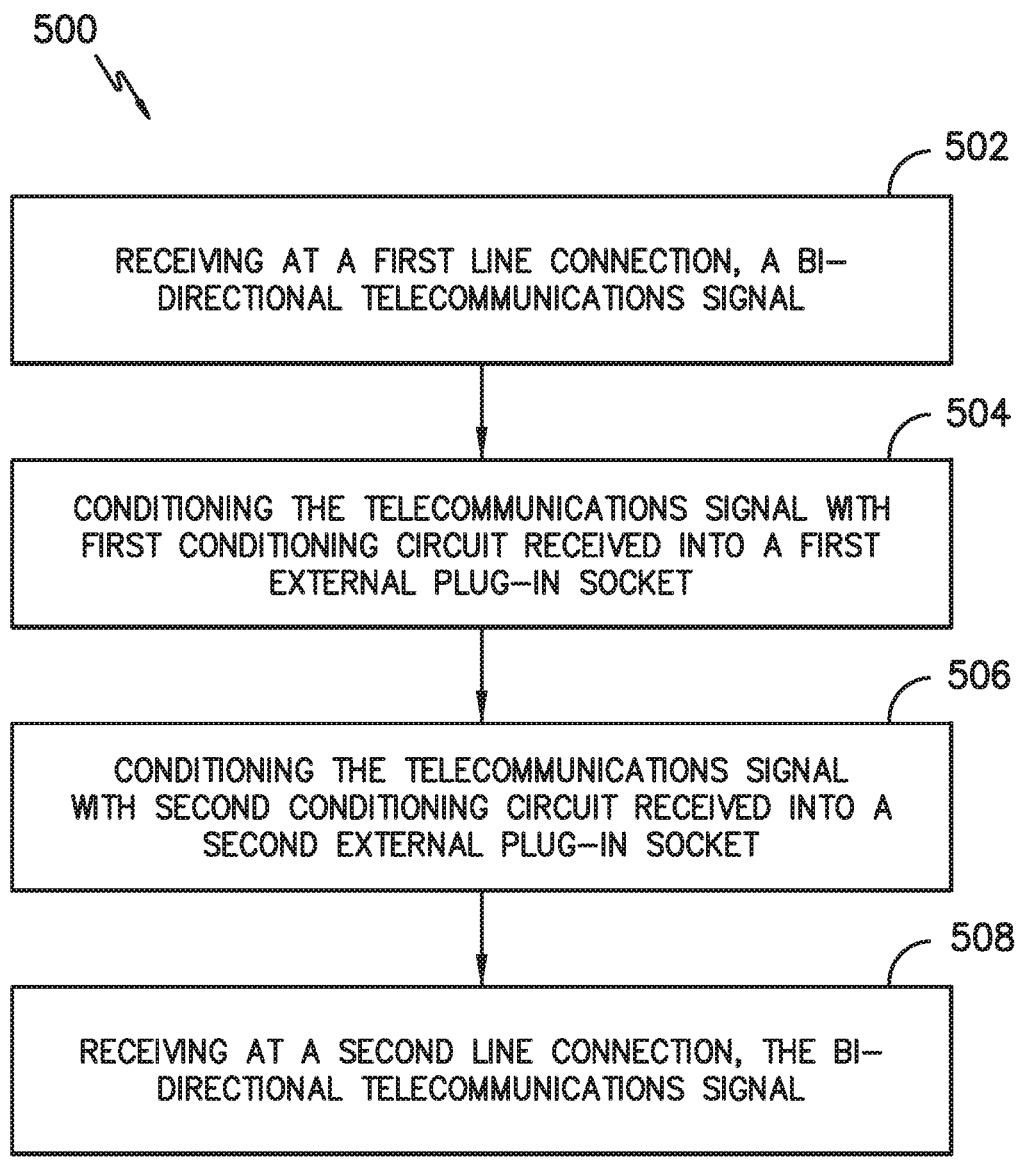
FIG. -5-

SINGLE PATH SIGNAL CONDITIONER FOR BI-DIRECTIONAL RADIO FREQUENCY SIGNALS IN A TELECOMMUNICATIONS NETWORK

FIELD

The present disclosure relates generally to telecommunications networks, and more particularly, to conditioning bi-directional radio frequency (RF) signals communicated over a coaxial cable portion of a telecommunications network.

BACKGROUND

Telecommunications networks, such as networks used by cable television, telephone, and internet services, can provide for communication of information using bi-directional radiofrequency (RF) signals, including a downstream signal (e.g. a forward signal) and an upstream signal (e.g. a return signal). The downstream signal can carry information from a service provider's headend to a user device at a user's location or premises. The upstream signal can carry information from the user device to the service provider's headend. To reduce interference, the downstream signal and the upstream signal can be associated with different frequency bands. For instance, the downstream signal can be associated with a first frequency band having a bandwidth from 54 MHz to 1,000 MHz while an upstream signal can be associated with a second frequency band having a bandwidth from 5 MHz to 42 MHz.

Telecommunications networks can communicate RF signals over coaxial cables. For instance, a telecommunications network can include a hybrid fiber-coaxial network that uses both optical fiber and coaxial cable. For instance, an optically modulated signal can be transmitted from a service provider's headend via an optical cable. A fiber optic node can receive the optically modulated signal and convert the optically modulated signal to an RF modulated signal. The RF modulated signal can be communicated to various locations using, for instance, coaxial cable. The coaxial cable portion of the telecommunications network can involve a trunk and branch configuration, with amplifiers provided at intervals to overcome attenuation and passive losses of the RF modulated signal. For example, a coaxial cable distribution line can be tapped to create individual "drop lines" to a user's location or premises.

SUMMARY

Aspects and advantages of embodiments of the present disclosure will be set forth in part in the following description, or may be learned from the description, or may be learned through practice of the embodiments.

One example aspect of the present disclosure is directed to a signal conditioning device for a telecommunications network. The signal conditioning device can include a housing, a first line connection, and a second line connection. The first line connection and the second line connection are capable of connecting to a coaxial cable configured to accommodate a bi-directional radio frequency communication signal. The signal conditioning device further includes a signal path coupled between the first line connection and the second line connection configured to accommodate a bi-directional communication signal. The signal conditioning device further includes at least one plug-in socket accessible on an exterior surface of the housing and coupled to the signal path. The at least one plug-in socket is capable of receiving at least one plug-in signal conditioner circuit configured to condition a signal.

Other example aspects of the present disclosure are directed to systems, methods, apparatus, and devices for conditioning bi-directional radio frequency signals in a telecommunications network, such as a coaxial cable portion of a telecommunications network.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 1 depicts an example telecommunications system according to example embodiments of the present disclosure;

FIG. 2 depicts an example signal conditioning device according to example embodiments of the present disclosure;

FIG. 3 depicts an perspective view of an example signal conditioning device according to example embodiments of the present disclosure;

FIG. 4 depicts a circuit diagram associated with an example signal conditioning device according to example embodiments of the present disclosure; and FIG. 5 depicts a flow diagram of an example method for conditioning a telecommunications signal according to example embodiments of the present disclosure.

DETAILED DESCRIPTION

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to conditioning bi-directional radiofrequency (RF) signals in a coaxial cable portion of a telecommunications network, such as telecommunications network associated with a cable television, phone, or internet service. Coaxial distribution lines associated with telecommunications networks can be tapped to create individual drop lines to a user's location or premises. According to example aspects of the present disclosure, a signal conditioning device is provided that can allow for the conditioning of bi-directional telecommunications signals (e.g., downstream and upstream signals) in a coaxial RF telecommunication system using a single signal conditioning device disposed at a single location along a coaxial cable, such as a coaxial drop line. The signal conditioning device can include first and second line connections, such as coaxial F connections, that are capable of being coupled to the coaxial cable.

The signal can be communicated between the first and second line connections of the signal conditioning device using a signal path. The signal conditioning device can include at least one plug-in socket (e.g. a JXP style plug-in socket) coupled to the signal path. The signal conditioning device can further include a first plug-in socket and a second plug-in socket (e.g. a JXP style plug-in socket) coupled to the signal path. The first plug-in socket and second plug-in socket can be connected in series between the first and second line connections on the signal path.

The at least one plug-in socket can provide for conditioning of the signal. For instance, a first plug-in signal conditioner circuit (e.g. a passive conditioning circuit) can be received into a first plug-in socket and a second plug-in signal conditioner circuit (e.g. a passive conditioning circuit) can be received into a second plug-in socket. The at least one plug-in signal conditioner circuit can be a JXP style plug-in conditioner circuit configured to provide one or more of a variety of signal conditioning effects. For instance, the first plug-in signal conditioning circuit and/or the second plug-in signal conditioner circuit can be an attenuator, an equalizer, a cable simulator, a bridge, or other signal conditioner circuit.

The signal can be a bi-directional telecommunications signal, and the at least one signal conditioner circuit can condition the signal. For example, an upstream component of a bi-directional telecommunications signal can be associated with a frequency band having a bandwidth from about 5 MHz to 42 MHz, while a downstream component of a bi-directional telecommunications signal can be associated with a frequency band having a bandwidth from about 54 MHz to 1,000 MHz. The at least one signal conditioner circuit (e.g. a first signal conditioner circuit and a second signal conditioner circuit) can be configured to condition a bi-directional telecommunications signal across a range of frequencies from about 5 MHz to about 1,200 MHz. In this way, the signal conditioning device can provide for conditioning of bi-directional telecommunications signals using a single device disposed at a single location in a telecommunications system.

The signal conditioning device according to example aspects of the present disclosure can be useful for many purposes. For instance, in one example application, the signal conditioning device can be used to condition bi-directional telecommunications signals in a drop line of a telecommunications system. In another example application, the signal conditioning device can be used to condition bi-directional telecommunications signals between a coaxial distribution line and signal monitoring equipment, such as a model used for status monitoring in power supply locations. Moreover, because upstream and downstream components of bi-directional telecommunications signals used in telecommunications systems are often limited to specific ranges, such as 5 MHz to 42 MHz for an upstream signal and 54 MHz to 1002 MHz for a downstream signal, 5 MHz to 65 MHz for an upstream signal and 85 MHz to 1002 MHz for a downstream signal, 5 MHz to 85 MHz for an upstream signal and 108 MHz to 1002 MHz for a downstream signal, or other upstream/downstream frequency configurations, the signal conditioning device according to example aspects of the present disclosure can be used in multiple upstream/downstream telecommunications signal frequency configurations, whereas signal conditioning devices configured to condition frequencies in specific ranges must be matched to a telecommunications systems operating in the same frequency ranges. In this way, the present disclosure can have a technical effect of allowing for a single device to be used to condition bi-directional telecommunications signals in a variety of telecommunications systems.

According to particular aspects of the present disclosure, a first and second plug-in socket can be accessible on an exterior surface of a housing associated with the signal conditioning device. As a result, a user or technician can easily install and/or replace various signal conditioning circuits for bi-directional telecommunications signals at a single location, providing an easy-to-use, customizable tool for conditioning signals in a telecommunications system. For example, a technician can determine at a particular location on a coaxial cable, such as at a drop line to a user's premises, that a bi-directional telecommunications signal is need of an equalizer and also attenuation. In this example, the technician can provide a plug-in equalizer in the first external plug-in socket to condition the signal. The technician can provide a plug-in attenuator in the second external plug-in socket to attenuate the signal. The technician can provide varying levels of attenuation/equalization by selecting and/or replacing the particular signal conditioning circuits provided into the external plug-in sockets. Other suitable combinations of signal conditioning circuits can be provided without deviating from the scope of the present disclosure.

With reference now to the FIGS., example embodiments of the present disclosure will now be discussed in detail. FIG. 1 depicts an example telecommunications system 100 according to an example embodiment of the present disclosure. The telecommunications system 100 is a hybrid fiber-coaxial telecommunication system. Example aspects of the present disclosure are discussed with reference to a hybrid fiber-coaxial telecommunications system for purposes of illustration and discussion. Those of ordinary skill in the art, using the disclosures provided herein, will understand that the signal conditioning device according to example embodiments of the present disclosure can be used with other suitable telecommunications systems, such as purely optical and/or purely coaxial based telecommunication systems.

The telecommunications system 100 includes a headend 110 associated with a service provider (e.g. cable television or internet service provider) that can provide information using an optically modulated signal to an optical node 115 via, for instance, a fiber connection. The optical node 115 can convert the optically modulated signal into an RF modulated signal. The RF modulated signal can be a bi-directional telecommunications signal that includes components of both a first frequency band signal and a second frequency band signal. The first frequency band signal can be a downstream (e.g. forward) signal and the second frequency band signal can be an upstream (e.g. return) signal.

The bi-directional telecommunications signal can be communicated over a coaxial cable portion of the telecommunications system 100, such as over coaxial distribution line 120 and coaxial distribution line 130. The coaxial distribution lines 120 and 130 can include amplifiers and other signal conditioning devices to condition the bi-directional telecommunications signal communicated over the coaxial distribution lines 120 and 130. Other coaxial distribution lines can be provided from the optical node 115 without deviating from the scope of the present disclosure.

Coaxial distribution line 120 can carry the bi-directional telecommunications signal over a distance to a service location 125. The service location 125 can be a location where the coaxial distribution line 120 can be tapped to provide individual drop lines to various loads, such as to a user premises (e.g. a house, apartment building, business location, etc.). The coaxial distribution line 120 can be tapped at other locations along the distribution line 120. The service location 125 can include various devices for attenuating, amplifying, or otherwise conditioning the RF modulated signal carried over the coaxial distribution line 120.

As shown in FIG. 1, coaxial distribution line 120 is tapped multiple times at service location 125 to create individual drop lines, such as drop line 122 and drop lines 124. Drop line 122 can carry the bi-directional telecommunications signal to a user's premises 150, such as to a user device 152 (e.g. a cable modem, cable box, etc.) at the user's premises 150. Drop lines 124 can carry bi-directional telecommunications signals to other premises or locales in the vicinity of the service location 125.

A signal conditioning device 200 according to example aspects of the present disclosure can be coupled to drop line 122. The signal conditioning device 200 can be configured to condition the bi-directional telecommunications signal at a single location on the drop line 122, such as at or near the user premises 150. Details concerning an example signal conditioning device 200 will be discussed in more detail below.

Coaxial distribution line 130 can communicate the bi-directional telecommunications signal over a distance to service location 135. The service location 135 can be a location where the coaxial distribution line 130 can be tapped to provide individual drop lines to various loads, such as to a user premises (e.g. a house, apartment building, business location, etc.). The coaxial distribution line 130 can be tapped at other locations along the distribution line 130. The coaxial distribution line 130 is tapped multiple times at service location 135 to create individual drop lines 134 to various user premises.

The coaxial distribution line 130 has also been tapped to create a drop line 132 to signal monitoring equipment 160. Signal monitoring equipment 160 can be a modem (e.g. a DOCSIS modem) used to monitor various aspects of signal quality of the telecommunications system 100. As shown, a signal conditioning device 200 according to example aspects of the present disclosure is coupled to the drop line 132 to condition the bi-directional telecommunications signal between the signal monitoring equipment 160 and the coaxial distribution line 130.

FIG. 2 depicts an example signal conditioning device 200 according to example embodiments of the present disclosure. The signal conditioning device 200 can include a housing 210. The housing 210 can be formed from any suitable material, such as a metal material. In one implementation, the housing 210 is formed from a material suitable for shielding the telecommunication signals in the signal conditioning device 200. The housing 210 can include a mechanical interface 212 (such as a screw connection) that allows for removal of an external faceplate 215 of the housing 210 to gain access to the interior of the signal conditioning device 200. The housing 210 can further include brackets 214 and 216 for mounting the signal conditioning device 200.

As further illustrated in FIG. 2, the signal conditioning device 200 can include a first line connection 222 and a second line connection 224. The first line connection 222 and the second line connection 224 can be capable of connecting to a coaxial cable, such as a coaxial cable associated with a drop line of a telecommunication system. For example, the first line connection 222 and the second line connection 224 can be coaxial F connections.

FIG. 3 depicts the connection of the signal conditioning device 200 to a coaxial cable, such as a drop line. More particularly, a first coaxial cable 232 can be coupled to the first line connection 222. The external faceplate 215 of the housing 210 can include indicia indicating that the "IN" cable connection is provided at the first line connection 222. A second coaxial cable 234 can be coupled to the second line connection 224. The external faceplate 215 of the housing 210 can include indicia indicating that the "OUT" cable connection is provided at the second line connection 222. While the present disclosure refers to "IN" and "OUT" connections to the signal conditioning device 200, those of ordinary skill in the art, using the disclosures provided herein, will understand that the nature of bi-directional telecommunication signals can allow for both "IN" and "OUT" connections to act as an input and/or output of the signal conditioning device 200.

Referring back to FIG. 2, the signal conditioning device 200 can include a first plug-in socket 242 and a second plug-in socket 244 accessible on a surface of the housing 210. As depicted in FIG. 2, the first plug-in socket 242 and the second plug-in socket 244 can be arranged adjacent to one another on the external faceplate 215 of the housing 210. The first plug-in socket 242 and the second plug-in socket 244 can each be configured to receive a plug-in signal conditioner circuit, such as a passive three-prong plug-in signal conditioner circuit. For instance, the first plug-in socket 242 and the second plug-in socket can be JXP style plug-in sockets adapted to receive JXP style plug-in signal conditioner circuits. In some embodiments, a cover can be placed on the external faceplate 215 of the housing 210. Example aspects of the present disclosure are discussed with reference to two plug-in sockets for purpose of illustration and discussion. Those of ordinary skill in the art, using the disclosures provided herein, will understand that the signal conditioning device 200 can include any number of plug-in socket, such as a single plug-in socket, three plug-in sockets, four plug-in sockets, or any other number of plug-in sockets.

As depicted in FIG. 2, a first plug-in signal conditioner circuit 252 can be received or plugged into the first plug-in socket 242. The first plug-in signal conditioner circuit 252 can be one of a plug-in attenuator, equalizer, cable simulator, bridge, or other signal conditioning device. A second plug-in signal conditioner circuit 254 can be received into the second plug-in socket 244. The second plug-in signal conditioner circuit 254 can be one of a plug-in attenuator, equalizer, cable simulator, bridge or other signal conditioning device. The second plug-in conditioner circuit 254 can be the same type of signal conditioning circuit or a different type of conditioning circuit relative to the first plug-in conditioner circuit 252.

As shown in FIG. 3, the first plug-in conditioner circuit 252 can be selectively plugged into and removed from the first plug-in socket 242. The second plug-in conditioner circuit 254 can be selectively plugged into and removed from the second plug-in socket 244. The first plug-in conditioner circuit 252, when received into the first plug-in socket 242, can be configured to condition a bi-directional telecommunications signal. The second plug-in conditioner circuit 254, when received into the second plug-in socket 244, can be configured to also condition the bi-directional telecommunications signal.

FIG. 4 depicts an example circuit diagram for the signal conditioning device 200 according to example aspects of the present disclosure. The signal conditioning device 200 includes a first line connection 222 and a second line connection 224. Surge protection circuits 282 and 284 can be included in the signal conditioning device 200 to provide surge protection capabilities. A bi-directional telecommunications signal can be communicated over a signal path 272 coupled between the first line connection 222 and the second line connection 224. In an embodiment, signal conditioning device 200 can include at least one plug-in socket coupled to the signal path 272. The at least one plug-in socket can receive at least one plug-in signal conditioner circuit (e.g. an equalizer, attenuator, cable simulator bridge, etc.) configured to condition the bi-directional telecommunications signal communicated over the signal path 272. As depicted in FIG. 4, a first plug-in socket 242 is coupled to the signal path 272. As discussed above, the first plug-in socket 242 can receive a first plug-in signal conditioner circuit (e.g. an equalizer, attenuator, cable simulator, bridge, etc.) configured to condition the bi-directional telecommunications signal communicated over the signal path 272. As depicted in FIG. 4, a second plug-in socket 244 is also coupled to the signal path 272 in series with the first plug-in socket 242 between the first line connection 222 and the second line connection 224. The second plug-in socket 244 can receive a second plug-in signal conditioner circuit (e.g. an equalizer, attenuator, cable simulator, bridge, etc.) configured to condition the bi-directional telecommunications signal communicated over the signal path 272.

The at least one plug-in signal conditioner circuit (e.g., the first plug-in signal conditioner circuit 242 and the second plug-in signal conditioner circuit 244) can condition a bi-directional telecommunications signal communicated over the signal path 272. For instance, a first frequency band component of a bi-directional telecommunications signal (e.g. an upstream signal) can have a bandwidth of about 5 MHz to 42 MHz. A second frequency band component of a bi-directional telecommunications signal (e.g. a downstream signal) can have a bandwidth of about 54 MHz to about 1000 MHz. As used herein, the term "about" when used in reference to a value is intended to refer to within 20% of the specified value. The at least one plug-in signal conditioner circuit can condition a bi-directional telecommunications signal across a frequency bandwidth that includes both upstream and downstream components of the bi-directional telecommunications signal. For instance, the signal conditioning device 200 can be configured to condition bi-directional telecommunications signals across a bandwidth of about 5 MHz to about 1200 MHz. As depicted in FIG. 4, because the first signal conditioning circuit 242 and the second signal conditioning circuit 244 are in series (i.e., in-line along the same signal path), both the first signal conditioning circuit 242 and the second signal conditioning circuit 244 can condition the bi-directional telecommunications signal as the bi-directional telecommunications signal is communicated over the signal path 272. Additionally, because the signal conditioning device can be configured to condition bi-directional telecommunications signals across a bandwidth of about 5 MHz to about 1200 MHz, both upstream components of a bi-directional telecommunications signal (e.g., signals between about 5 MHz and about 42 MHz) and downstream components of a bi-directional telecommunications signal (e.g., signals between about 54 MHz and about 1002 MHz) can be conditioned by the at least one signal conditioning circuit. In this way, the signal conditioning device 200 can be configured to condition bi-directional telecommunications signals.

Additionally, the signal conditioning device 200 according to example aspects of the present disclosure can be used in a variety of upstream/downstream frequency configurations. For example, telecommunications systems are often operated at specific frequency splits for upstream and downstream signals, such as about 5 MHz to about 42 MHz for an upstream signal and about 54 MHz to about 1002 MHz for a downstream signal, about 5 MHz to about 65 MHz for an upstream signal and about 85 MHz to about 1002 MHz for a downstream signal, and about 5 MHz to about 85 MHz for an upstream signal and about 108 MHz to about 1002 MHz for a downstream signal. Other upstream/downstream frequency configurations can also be used in telecommunications systems. The signal conditioning device 200 according to example aspects of the present disclosure can be configured to condition bi-directional telecommunications signals across a range of frequencies that includes a variety of upstream/downstream frequency configurations. For example, the signal conditioning device 200 can be configured to condition bi-directional telecommunications signals from about 5 MHz to about 1200 MHz, thereby allowing both the upstream and downstream components of bi-directional telecommunications signals in a variety of upstream/downstream frequency configurations to be conditioned. In this way, the signal conditioning device 200 according to example aspects of the present disclosure can allow for bi-directional telecommunications signals to be conditioned by a single type of signal conditioning device in telecommunications systems operated at multiple upstream/downstream frequency configurations, and allow for increased flexibility in operating telecommunications systems.

Additionally, the signal conditioning device 200 according to example aspects of the present disclosure can allow for telecommunications systems to be upgraded from a first upstream/downstream frequency configuration (e.g., about 5 MHz to about 42 MHz for an upstream signal and about 54 MHz to about 1002 MHz for a downstream signal) to a second upstream/downstream frequency configuration (e.g., about 5 MHz to about 65 MHz for an upstream signal and about 85 MHz to about 1002 MHz for a downstream signal) without requiring existing signal conditioning devices on the telecommunications system to be replaced, as would be required if the signal conditioning device were matched to a specific upstream/downstream frequency configuration. In this way, the signal conditioning device 200 according to example aspects of the present disclosure can reduce the cost associated with upgrading a telecommunications system because fewer replacement components may be required for the upgrade.

FIG. 5 depicts a flow diagram of an example method (500) according to example aspects of the present disclosure. The method (500) can be implemented using the signal conditioning device 200 of FIGS. 2-4. In addition, FIG. 5 depicts steps performed in a particular order for purposes of illustration and discussion. Those of ordinary skill in the art, using the disclosures provided herein, will understand that various steps of any of the methods disclosed herein can be adapted, modified, expanded, omitted, and/or rearranged in various ways without deviating from the scope of the present disclosure.

At (502), the method includes receiving, at a first line connection of a signal conditioning device, bi-directional telecommunications signal. For instance, a bi-directional telecommunications signal can be received at the first line connection 222 of FIG. 2.

At (504) of FIG. 5, the signal is conditioned using a first plug-in conditioning circuit received into a first external plug-in socket. For instance, the bi-directional telecommunications signal can be conditioned using the first plug-in signal conditioning circuit 252 plugged into the first plug-in socket 242 accessible from an exterior surface of the housing 210 of the signal conditioning device 200 of FIG. 2. The bi-directional telecommunications signal can be conditioned using the first plug-in conditioning circuit in a variety of ways. For instance, the bi-directional telecommunications signal can be conditioned using an attenuator, equalizer, cable simulator, bridge or other conditioning circuit.

At (506) of FIG. 5, the bi-directional telecommunications signal can be conditioned using a second plug-in conditioning circuit received into a second external plug-in socket. For instance, the bi-directional telecommunications signal can be conditioned using the second plug-in signal conditioning circuit 254 plugged into the second plug-in socket 244 accessible from an exterior surface of the housing 210 of the signal conditioning device 200 of FIG. 2. The bi-directional telecommunications signal can be conditioned using the second plug-in conditioning circuit in a variety of ways. For instance, the bi-directional telecommunications signal can be conditioned using an attenuator, equalizer, cable simulator, bridge or other conditioning circuit.

At (508) of FIG. 5, the method includes receiving, at a second line connection of a signal conditioning device, the bi-directional telecommunications signal. For instance, the bi-directional telecommunications signal can be received at the second line connection 224 of FIG. 2.

The method (500) described herein can be used to upstream and downstream components of a bi-directional telecommunications signal. For example, a bi-directional telecommunications signal sent from a first line connection to a second line connection could be designated a downstream signal, whereas a bi-directional telecommunications signal sent from the second line connection to the first line connection could be designated an upstream signal. Those of ordinary skill in the art will understand that upstream and downstream components of a bi-directional telecommunications signal can be conditioned by both a first signal conditioning circuit and a second signal conditioning circuit using the disclosures provided herein.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A signal conditioning device for a telecommunications network, comprising:
a housing;
a first line connection and a second line connection;
a single signal path coupled between the first line connection and the second line connection configured to accommodate a bidirectional communication signal;
a first plug-in socket accessible on a surface of the housing and coupled to the single signal path, the first plug-in socket capable of receiving a first plug-in signal conditioner circuit configured to condition the bidirectional communications signal; and
a second plug-in socket accessible on the surface of the housing and coupled to the single signal path, the second plug-in socket capable of receiving a second plug-in signal conditioner circuit configured to condition the bidirectional communications signal;
wherein the first plug-in socket and the second plug-in socket are connected in series on the single signal path; and
wherein the bidirectional communication signal comprises an upstream signal and a downstream signal.

2. The signal conditioning device of claim 1, wherein the first and second plug-in sockets are arranged adjacent to one another on the surface of the housing.

3. The signal conditioning device of claim 1, wherein the signal conditioning device is configured to condition signals across a bandwidth of about 5 MHz to about 1200 MHz.

4. The signal conditioning device of claim 1, wherein the first and second line connections are coaxial F connectors.

5. The signal conditioning device of claim 1, wherein the first or the second plug-in socket is a JXP style plug-in socket.

6. The signal conditioning device of claim 1, wherein the first signal conditioner circuit is received in the first plug-in socket and the second signal conditioner circuit is received in the second plug-in socket.

7. The signal conditioning device of claim 6, wherein the first or the second conditioner circuit is a JXP style plug-in signal conditioner circuit.

8. The signal conditioning device of claim 6, wherein the first or the second conditioner circuit is an attenuator, an equalizer, a cable simulator, or a bridge.

9. The signal conditioning device of claim 6, wherein the first plug-in conditioner circuit is a different type of conditioner circuit than the second plug-in conditioner circuit.

10. A telecommunications system, comprising:
a distribution line comprising a drop line to a user location;
a signal conditioning device comprising a first line connection and a second line connection, the signal conditioning device further comprising a single signal path coupled between the first line connection and the second line connection configured to accommodate a bidirectional communication signal;
a first cable coupled between the distribution line and the first line connection of the signal conditioning device; and
a second cable coupled to the second line connection of the signal conditioning device and a user device at the user location;
wherein the signal conditioning device comprises at least one plug-in signal conditioning circuit plugged into at least one plug-in socket located on a surface of the signal conditioning device and coupled to the single signal path; and
wherein the signal conditioning device is configured to condition the bidirectional communication signal at the user location.

11. The telecommunications system of claim 10, wherein the at least one plug-in signal conditioning circuit comprises a first plug-in signal conditioning circuit plugged into a first plug-in socket and a second plug-in signal conditioning circuit plugged into a second plug-in socket, wherein the first plug-in socket and the second plug-in socket are connected in series on the signal path.

12. The telecommunications system of claim 10, wherein the first cable and the second cable form at least a part of a drop line between the distribution line and a user premises.

13. The telecommunications system of claim 10, wherein the second cable is coupled to a signal monitoring device.

14. The telecommunications system of claim 10, wherein the distribution line is coupled to a headend of a service provider of the telecommunications system.

15. A method for conditioning a telecommunications signal, comprising:
- receiving, at a first line connection of a signal conditioning device, a bidirectional communications signal from a first cable;
- conditioning the bidirectional communications signal with a first plug-in signal conditioning circuit received into a first plug-in socket accessible at a surface of a housing associated with the signal conditioning device, the first plug-in socket coupled to a single signal path configured to accommodate the bidirectional communications signal; and
- receiving, at a second line connection of the signal conditioning device, the bidirectional communications signal from a second cable;
- wherein the housing of the signal conditioning device is configured to be accessible by a user to select or replace the first and second plug-in signal conditioning circuits in the signal conditioning device at a user location for conditioning the bidirectional communications signal at the user location.

16. The method of claim 15, wherein the method further comprises:
- conditioning the communications signal with a second plug-in signal conditioning circuit received into a plug-in socket accessible at the surface of the housing of the signal conditioning device.

* * * * *